(12) United States Patent
Dyatlov et al.

(10) Patent No.: US 7,953,948 B1
(45) Date of Patent: May 31, 2011

(54) SYSTEM AND METHOD FOR DATA PROTECTION ON A STORAGE MEDIUM

(75) Inventors: Dennis S. Dyatlov, Moscow (RU);
Yuriy V. Tsybrovskyy, Moscow (RU);
Maxim V. Lyadvinsky, Moscow (RU);
Serguei M. Beloussov, Singapore (SG)

(73) Assignee: Acronis Inc., Tortola (VG)

( * ) Notice: Subject to any disclaimer, the term of this patent is extended or adjusted under 35 U.S.C. 154(b) by 623 days.

(21) Appl. No.: 12/126,332

(22) Filed: May 23, 2008

Related U.S. Application Data (63) Continuation-in-part of application No. 11/154,660, filed on Jun. 17, 2005, now Pat. No. 7,603,533.

(51) Int. Cl.
*G06F 12/00* (2006.01)
(52) U.S. Cl. ........ 711/163; 711/114; 711/118; 711/151; 711/158; 711/161; 711/162; 711/203; 709/217; 709/219; 709/225; 709/229
(58) Field of Classification Search .................. 709/217, 709/219, 225, 229; 711/114, 118, 151, 158, 711/161, 162, 163, 167, 203
See application file for complete search history.

(56) References Cited

U.S. PATENT DOCUMENTS

6,748,502 B2 * 6/2004 Watanabe et al. ............. 711/158
* cited by examiner

*Primary Examiner* — Midys Rojas
(74) *Attorney, Agent, or Firm* — Bardmesser Law Group (57) ABSTRACT

A method of and system for protecting a disk drive or other data storage includes mounting a virtual storage that combines a READ-only portion of a volume of the main storage and a full access temporary storage located on the same data storage, wherein the READ-only portion represents a protected area of the volume of the main storage; generating a bitmap for blocks of the virtual storage; redirecting virtual storage write requests to the temporary storage; marking, in the bitmap, blocks of the virtual storage corresponding to blocks of the temporary storage that are being written to; redirecting, to the READ-only portion, read requests for unmarked blocks; redirecting, to the temporary storage, read requests for marked blocks; upon an acceptance of a state of the virtual storage, merging the temporary storage with unmarked blocks of the READ-only portion of the volume of the main storage, to form an integral storage; and upon a rejection of a state of the virtual storage, terminating the redirecting. Optionally, data in the temporary storage can be archived.

10 Claims, 7 Drawing Sheets

SYSTEM AND METHOD FOR DATA PROTECTION ON A STORAGE MEDIUM

CROSS REFERENCE TO RELATED APPLICATIONS

This application is a continuation-in-part of U.S. patent application Ser. No. 11/154,660, filed Jun. 17, 2005, entitled SYSTEM AND METHOD FOR DATA PROTECTION ON A STORAGE MEDIUM, which is incorporated herein by reference in its entirety.

BACKGROUND OF THE INVENTION

1. Field of the Invention

The present invention relates to protecting computing systems from loss of data due to software faults, and more particularly, to fast restoration of the computing systems in case of data corruption as a result of software execution.

2. Related Art

With the popularity and success of the Internet, server technologies are of great commercial importance today. An individual server application typically executes on a single physical host computer, servicing client requests.

In conventional systems, the data of the server is typically backed up on some storage device in the form of backup files. If the server crashes or fails, or if the software becomes corrupted, it may become necessary to restore the state of the server to some previously backed-up state.

Usually, the conventional backup process consists of three steps: (1) the machine is taken out of service; (2) the data is backed up to the backup storage, e.g., a disk drive, used by the server; and (3) the server is restarted. In case of a crash or failure, data is restored from the backup image, and the server is restarted.

Conventional methodology for restoring computing systems normally requires a full or partial backup of relevant data that may be corrupted or modified in an illegal manner, and then, in case of a crash, restoration of the data from the backup. These procedures are generally fairly time- and memory-consuming, since two conversions of data are required in case of system fault.

Such procedures require a lot of downtime, since during the back up and restoration, the server is inoperable. This is inefficient, disrupts normal operations, and is usually unnecessary, given that the vast majority of the data on the local drive is frequently unaltered, notwithstanding the fact that the entire local drive is backed up.

In corporate networks, a typical server can have 100-200 Gigabytes (or, frequently, much more than that) of data. With a transfer rate of up to 100 Megabytes per second over a network, it would take approximately 1,000-2,000 seconds to transfer all the data from the backup storage to the server's local storage. This assumes that the entire network bandwidth is available for this process. Frequently, this is not the case, since only a fraction of the bandwidth may actually be available at any given time for restoring the files from backup. In practice, such transfers of data from backup to the server's local storage can take many hours.

Also, even 1,000 seconds of downtime is an extremely long time, particularly for many mission-critical applications. For example, if the server in question is a web server that handles customer requests or sales, a period of 16-20 minutes of downtime can result in substantial lost sales. Furthermore, it is generally believed that for many e-commerce applications, consumer attention span is relatively short, and a customer that does not receive a rapid response from a web server will simply go to a competitor's website.

One of the problems that arises in the context of testing or running of a new software is protection or preservation of the contents of the hard drive (or some other storage medium) as of a particular point in time. For example, the hard drive may contain data and executable files at some particular time $t_1$ that is known to be "correct" (or valid in some sense) and virus-free. A user or a software developer may wish to install additional software that does not have a presumption of validity, or a presumption of being virus-free. Thus, the original disk contents at the time $t_1$ needs to be stored in some manner, so that, in the event that the new software is defective, or contains viruses, or corrupts the contents of the hard drive, the original contents of the hard drive at the time $t_1$ can be rapidly restored at the time $t_2$, assuring continuity and system functionality.

Therefore, there is a need in the art for an efficient and fast data restoration to a pre-defined restoration point, as well as for a more efficient method of restoring data of a computer system. Also, there is a need to be able take a snapshot of a hard drive, and to be able to restore the condition of the system to the contents of the snapshot with minimum overhead and as rapidly as possible.

SUMMARY OF THE INVENTION

The present invention relates to a system and method for storage medium data protection that substantially obviates one or more of the disadvantages of the related art.

More particularly, in an exemplary embodiment of the present invention, a method of and system for protecting a disk drive or other data storage includes mounting a virtual storage that combines a READ-only portion of a volume of the main storage and a full access temporary storage located on the same data storage, wherein the READ-only portion represents a protected area of the volume of the main storage; generating a bitmap for blocks of the virtual storage; redirecting virtual storage write requests to the temporary storage, which is a part of the volume of the main storage; marking, in the bitmap, blocks of the virtual storage corresponding to blocks of the temporary storage that are being written to; redirecting, to the READ-only portion, read requests for unmarked blocks; redirecting, to the temporary storage, read requests for marked blocks; upon an acceptance of a state of the virtual storage, merging the temporary storage with unmarked blocks of the READ-only portion of the volume of the main storage, to form an integral storage; and upon a rejection of a state of the virtual storage, terminating the redirecting. Optionally, data in the temporary storage can be archived.

Optionally, multiple temporary storages can be used to create multi-branched storage structure. Different virtual storages based on a single drive (volume of the main storage) can be used, if desired, for updating the volume of the main storage that is simultaneously used by different applications, using a plurality of temporary storages with concurrent access to the volume of the main storage, while updating a plurality of virtual storages. The different applications can run in different operating environments. The blocks of the temporary storage can be "write-once-read-many times" blocks.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Reference will now be made in detail to embodiments of the present invention, examples of which are illustrated in the accompanying drawings.

The present invention is related to a utility for server restoration or data protection that works on a data block level, where "blocks" can refer to data blocks themselves, such as disk sectors, or clusters or similar aggregates of blocks. It should be understood that although the term "hard drive" or "hard disk drive" (HDD) is commonly used, the actual storage medium at issue does not need to be an entire disk drive (or even a disk drive as such). It can be a logical drive, a flash disk, a partition of a disk drive assigned to a particular server, or a partition assigned to a particular virtual private server. It can also be a network drive or a portion of a network drive, or it can be a distributed storage system that acts as a single logical drive. However, from the perspective of an operating system, a device exists and acts analogously to a hard disk drive that can be accessed using device drivers. Furthermore a server is only an example of the computing system where the invention may be used. Other hardware systems, such as desktops or mobile computers, can also use the invention.

Here and afterwards, the term "critical applications" refers to OS and user applications running on the server or computing system, as well as to applications that can cause a failure not by their nature, but as a result of a user's actions, such as deletion of files or changing system or other settings.

The proposed approach is designed to protect a computer system from crashes or failures, for example, in the context of testing new software for functionality and compatibility issues, as well as for any operation when virus infection is a possibility, or when using other software perceived as a possible threat. The proposed approach can also be used when a single initial state of a hard drive, or other storage devices, or parts of storage devices, is used by multiple operating systems on the same or different computers. Also, the proposed approach can be used for storing different states of the storage units with the same initial state.

The discussion herein is therefore primarily directed to the interaction between two elements:

(a) a protected area of the volume of the main storage (in the discussion below, "protected area"), which represents a data structure at a defined point in time; and (b) a temporary, or intermediate, storage (in the discussion below, "temporary storage" or "temporary data storage") (in effect, a buffer with random access) that records additions and changes to the data structure, initially represented by the protected area so that user applications can read the unchanged blocks from the protected area, and changed (or newly written) blocks from the temporary storage. (Note that user applications normally read and write blocks via system drivers, and not directly).

The present approach protects the data of a hard drive by activating a special redirection driver for read and write requests (or any other disk access requests that alter the contents of the data), so that write requests are redirected to the temporary storage. Also, there is a handler of BIOS interrupt module, which interrupts the boot loader requests, for example, BIOS or EFI requests, to the media from which it is booting up, and redirects them to the temporary storage.

This process is transparent to the user application, although the user can be provided with an indicator (such as an on-screen icon) informing the user that the data protection system has been activated, and that all write requests are redirected elsewhere.

The redirection driver and handler of BIOS interrupt module (in case of reboot of a computer system) decide whether the access request needs to be addressed to the temporary storage, or to the protected area. Normally, a read request is intercepted by the redirection driver and/or the handler of BIOS interrupt module and addressed either to the protected area or to the temporary storage if the particular data block has been altered, or changed, or created, since a time $t_1$, where $t_1$ is the time when a protection procedure was started. If the data block in the virtual storage has not been changed from $t_1$, then that data will be read from the protected area.

The redirection driver and/or the handler of BIOS interrupt module intercepts and redirects all write requests to the temporary storage. Similarly, all requests to delete a data block or to create a new file (i.e., a collection of data blocks) will be executed by utilizing the temporary storage. For example, deletion of a file may be reflected in blocks of the temporary storage corresponding to the blocks of file description structure (or other logical objects) of the virtual drive. Such a descriptor can be stored in a file allocation table (FAT), or a master file table (MFT) in of the terminology of DOS or Windows® family operating systems, or inode in UNIX file systems, or similar structures. For simplicity, here and afterward, descriptors used in file systems will be called file allocation table, or file allocation table.

It should be noted that the redirection driver preferably works on a physical address level that is below the file level, in other words, on a data block level. Furthermore, the process can be performed in an online manner, in other words, it can be a background process.

At some point (time $t_2$), the user has the option of deciding whether to accept the changes, or to return to the original system state, as of the time $t_1$. In the event that the user decides to reject, or drop, the changes (for example, if the software that he is testing is "buggy," or does not perform as expected, or causes system crashes, etc.), then, through a simple interface (such as an on-screen icon or button), the user can "reject" the changes, which means that the redirection driver and/or the handler of BIOS interrupt module will no longer redirect any requests to the temporary storage. Going forward, all the access requests will be directed to the blocks of the area previously being protected, creating the effect of restoring the system state as of the time $t_1$ in minimal time (due to the fact that all that needs to change is the operation of the redirection driver).

In the event that the user decides to accept the state of the system at the time $t_2$ as the "real" state of the system, the user can do so by starting a dedicated utility that merges the protected area and the temporary storage to form a new state of the volume of the main storage that corresponds to the virtual storage. Such a dedicated utility can be started, e.g., using a graphical interface, such as through an icon or button on a screen or monitor. This tells the redirection driver that the data in the temporary storage should be treated as "valid" data going forward. Also, the data in the temporary storage needs to be restored as valid data in the volume of the main storage. This can be done online (as a background process), such that, to a user, no discontinuity is apparent. The system can therefore copy, merge or otherwise accepts the required blocks from the temporary storage to the volume of the main storage as a background process. After that, the redirection aspect of the driver can be deactivated. Once the copying is completed, the data of the volume of the main storage will be treated as the "real" data, and at least some of the contents of the temporary storage can be ignored. While the process of accepting changes is performed, the redirection process should preferably stay active.

One way to implement the redirection driver is through the use of a bitmap and a database that contains a set of translations, or links, to the locations of the relevant data blocks. For example, the bitmap can have a bit or flag corresponding to each data block in the volume of the main storage, where, e.g., a "0" in the particular bit of the bitmap can represent the fact that the data in that data block has not been change since the time $t_1$. A "1" therefore could represent the fact that the data of that data block has been changed (or vice versa). In the event that it has been changed, the database contains a link to the physical address at which the modified data block can be found.

Another way to view this is to consider the bitmap as an indicator of the validity of the links in a database. A "0" bit in the bitmap means that the link is not valid, while a "1" in the bitmap means that the link is valid (or vice versa, as desired by the particular developer). Resetting the bitmap to zero is functionally analogous to dropping all changes. At the same time, there is no need to clear memory areas that store links. During the process of accepting the changes to the data reflected in the temporary storage, the bits in the bitmap are reset once the data block at issue has been copied from the temporary storage to the area that was previously protected, or to another block of the volume of the main storage, or have been merged to the volume of the main storage by other way.

This approach allows for a very rapid restoration of the system state to a particular "protected state" (i.e., the state of hard drive as of the time $t_1$), since all that needs to be done is to disable the redirection feature of the disk driver. This, in turn can be accomplished in any number of ways, for example, by resetting all the bits and the bitmap to zero, or by disabling the checking of the bitmap, or by simply recalling or reloading/activating the "standard" system driver for that particular peripheral (i.e., for that particular type of storage, such as hard disk drive or flash drive). Thus, the restoration of the system state to the time $t_1$ can be accomplished practically instantaneously, and the user has the option to accept the changes or to reject the changes.

The temporary storage can be implemented in number of ways. It can be another partition of the same physical drive (local drive) as the volume of the main storage, or a different physical hard drive, a network drive, a collection of drives, a DVD-RAM, a RAM (e.g., a flash disk), or it can share a partition or a drive with the protected part of the storage device, etc. In the latter case, free blocks of the partition can be assigned to the temporary storage, e.g., in succession or simultaneously with starting the protection procedure.

Also, the temporary storage can be implemented in any other manner in which data storage is implemented, such that it can be addressed on a block level, as is known in the art. The temporary storage can be formed from a combination of data blocks of the main drive and data blocks of an external drive. The temporary storage can be physically located, for example, on a network drive, on an element of a storage area network, can be part of the main drive, or on an area of a main drive specifically reserved (dedicated) for the temporary data storage. The protected area can be the entire main drive (main data storage), or a portion of the main drive, or some subset of sectors or clusters of the main drive.

In one embodiment, virtual storage is mounted (i.e., made available to the OS) for example, by updating a device driver for the volume of the main storage, or by updating or changing or replacing its component(s), or by replacing the device driver, or by otherwise changing its behavior, e.g., by adding a filter to the device driver) for providing protecting and restoring the HDD without significant downtime. Virtual storage is a combination of two storages: the protected area of the main drive and the temporary data storage. (Note that "virtual storage" is a logical construct of convenience—the actual hardware does not change, the only thing that changes is how the various hardware elements are handled.) The protected area can include contents of a hard disk drive (HDD), a file structure together with the files' data, or any other data set that has internal order. The second part of the virtual storage is the temporary storage, where changes of the virtual storage are reflected. Thus, changes or edits to the files or other data structures in the main drive being affected by a user applications or system utilities can be registered and handled in the virtual storage as if it were real storage.

The main data storage's volume (or partition) of the computing system, such as a server, is thus protected, and stays unchanged in the relevant part or during execution of applications that can cause a critical failure during (or as a result of) execution. The temporary storage reflects contents of blocks of the main data storage's volume that have to be changed or overwritten during execution of the critical applications.

The virtual storage can be embedded in OS address space to represent the main data storage's volume. Note also that the virtual storage blocks exist at the lowest logical level being accessed by the OS, e.g., at the level of clusters or sectors where available. Note that working with the virtual storage requires appropriate drivers, for example, by updating, changing, replacing or otherwise modifying behavior of standard drivers to act as custom (dedicated) drivers.

The virtual storage can represent a full drive, or a drive partition (in the Windows operating system, designated by a different letter), a folder in the file system, or a single file, or represented by a block that can be modified separately, e.g., a database. Note that data handling is performed on a block level, while the main data storage's volume, i.e., totality of blocks being protected, may be defined at a higher logical level. In UNIX, a virtual data set can be mounted by creating a mount point accessible in a common name space.

It should be noted that the approach to mounting a virtual storage for files, folders or disk portions described above ensures correct and reliable operation of all system processes and user applications, to the extent that they use data stored in the virtual storage device. A virtual storage that is being mounted or otherwise created is automatically recognized by the system applications as if it were an integral structure.

In one embodiment, the blocks are created in the temporary storage "on-the-fly", for single writing, and all the changes of the virtual storage are reflected in the temporary storage. In this case, allocations of the blocks with the latest version only can be reflected together with the bitmap.

The updating of the volume of the main storage (e.g., after closing critical applications) can be done, for instance, as a background process, by copying data from the temporary data storage to the volume of the main storage, as described in application Ser. No. 10/925,928; Filed: Aug. 26, 2004, entitled: SYSTEM AND METHOD FOR USING FILE SYSTEM SNAPSHOTS FOR ONLINE DATA BACKUP, which is incorporated by reference herein in its entirety.

Figure 1:
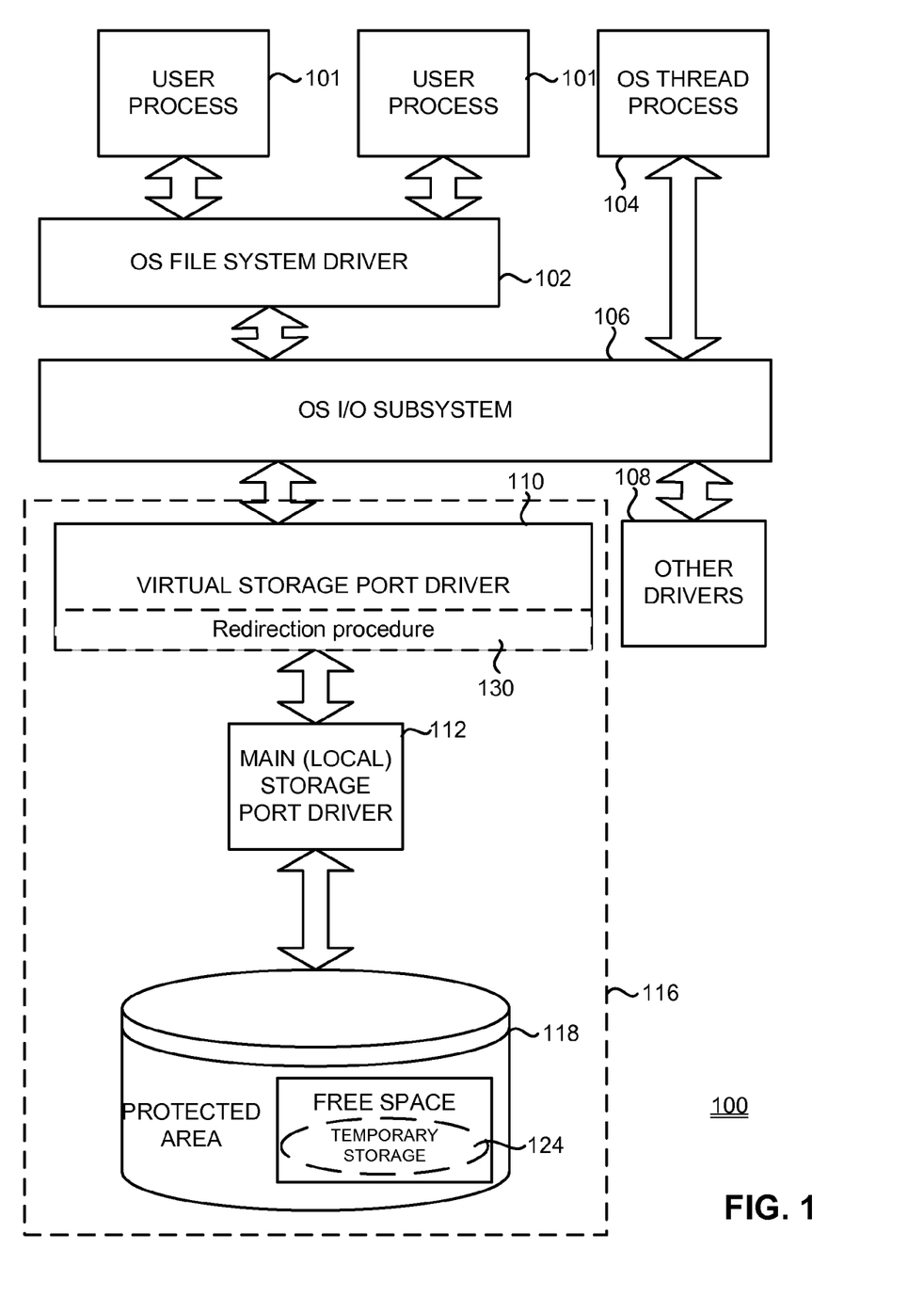
FIG. 1 illustrates an example of a data processing model when a protected mode is in effect.

FIG. 1 shows a data processing diagram in a computing system 20 that has a protected volume of the main storage structure. The computing system 20 supports execution user processes 101 executing in an OS environment having a file system driver 102. Also, one or more OS thread processes 104 may be executed in parallel with user processes. Such OS processes also can modify data represented on the volume of the main storage (main data storage's volume). An OS I/O subsystem 106 is in communication with the file system driver 102. The I/O subsystem 106 uses a class driver to manage and deliver I/O requests to device driver 112, that provide communication to corresponding devices: I/O ports (not shown), local area network controllers (not shown), main data storage's volume 118 and temporary data storage (temporary storage) 124, that are disposed within the free space of the main data storage's volume. Temporary data storage 124 is used for storage of data being generated by processes that write data to the virtual storage 116 and for subsequent reading of data that had been previously written. For better illustration, the volume of the main storage 118 is represented on the FIG. 1 as fully protected. In other words, the volume of the main storage 118 corresponds to the protected area.

In one embodiment, the main data storage's volume 118 has a protected area with read only access and an unprotected area, including temporary storage with random access.

Requests to the virtual storage 116 can be managed by means of dedicated driver (virtual storage driver) 110 that addresses data corresponding to access requests via a storage port by use of storage port driver 112, selected based on a result of bitmap checking. The virtual storage port driver 110 is used to intercept access requests to the volume of the main storage, as well as for organizing the virtual storage 116 (its components are shown as single structures, although they can be multiple storage elements). The virtual storage driver 110 therefore includes a redirection procedure 130 that references the bitmap shown, for example, as a part of the virtual storage driver.

The main data storage's volume 118 is "frozen" at some predefined point in time $t_1$. In the virtual storage 116, all WRITE requests should be addressed to the temporary data storage 124, instead of to the main data storage's volume 118.

Protected area (volume of the main storage 118) and temporary data storage 124 are hidden from the I/O subsystem 106 as separate storage areas, and their content is accessed by the I/O subsystem 106 as having an integral (unified) address space (including handling any issues with access requests for non-existent data or files). Also, the protected area of the volume of the main storage 118, when the data protection mode is activated, can be accessed for READ-only access for the I/O subsystem 106, while the temporary data storage 124 is generally writable storage. Write-once-read-many blocks device can also be used as a temporary storage, where all the changes to the main data storage's volume 118 are recorded, and then the latest version of the edited data blocks may be read on demand.

In case of an unsafe event (e.g., a crash or failure), the virtual storage port driver 110 and all associated data can be removed (or discarded). In this case, the system 20 returns to its initial state at once, without time delay. After emergency completion of the applications that are running (or in case of restoring, of the initial state of the main data storage's volume 118), and removal of the virtual storage driver 110 (or its component, such as the bitmap) from the OS, the I/O subsystem 106 manages requests to main data storage's volume 118, and, if needed, to the temporary data storage 124 directly, by means of local port driver 112, what will be described below. When the main data storage's volume 118 contains OS data, the server 100 should be rebooted concurrently with or after removing virtual storage port driver 110.

After closing all the critical applications (or at any other point in time, defined by the user), the data and the changes can be accepted by copying blocks from the temporary data storage 124 to corresponding blocks of the main data storage's volume 118 as a background process with minimal downtime. Although the process of accepting the data in response to a user command is performed in the background, it can also be performed as a process with the higher priority level or in a single process mode.

Also, data and the changes can be accepted by updating description of the logical structure of the volume of the main storage 118, such that blocks of the temporary data storage 124 are now identified as main data storage's volume 118 blocks.

On the other hand, in case of failure or a critical error, all the data in the temporary data storage 124 can be dropped at once, and the computer or server 20 can restart in its previous state, without requiring the time to restore the server 20 from the backup.

Also, data from the temporary data storage 124 can be saved, in order to form a backup increment for restoring the computing system 20 to a state at some selected point of time. Furthermore, part of the temporary data storage 124 can be "frozen" to create an additional restore point. In this case, two or more parts of the temporary data storage 124 can be treated as described earlier. Thus, a plurality of restore points can be established.

Also, a number of temporary storages may be created, to form a plurality of virtual data storages (for example, drives with different letters).

Once the unsafe application process has been completed, and all the changes have been accepted by the user, a data acceptance procedure can be started to merge or combine the main data storage's volume 118 and the temporary data storage 124 into a single storage.

FIG. 1 also shows a data processing diagram in a computing system 20 that is in the process of accepting changes generated during the data protection mode. The main difference between the system in the data protection mode and in the data acceptance mode is that a data acceptance procedure is added to (or activated in) the operating system. Also, the main data storage's volume 118 can become available for random access.

The data acceptance procedure can be implemented as a background process. The data acceptance procedure restores blocks of the temporary data storage 124 in corresponding blocks of the main data storage's volume 118 and/or modifies file allocation table of the main data storage's volume 118, based on addresses of corresponding blocks of the temporary data storage 124. It aggregates (merges) blocks of the temporary data storage 124 with the main data storage's volume 118 either by restoring blocks or by updating file allocation table, in correspondence with the bitmap, that may be commonly accessed and modified by data acceptance procedure and virtual storage driver 110. In some embodiments, blocks of the temporary data storage 124 reflected in the file allocation table of the main data storage's volume 118 are unmarked.

Though the data acceptance procedure (which can also be called a "data transfer procedure") runs in connection with the virtual storage port driver 110, it provides correct access to the virtual storage 116 by user processes 101 and OS thread processes 104. For instance, the bitmap and redirection identifiers (links) can be used by both virtual storage port driver 110 and by the data transfer procedure.

Note that frequently, the main data storage's volume 118 is physically local to the computing system 20, although, with modern networking technology, this need not be the case. Also, temporary data storage 124 can be physically local, physically remote, or distributed (such as in the form of a storage area network).

There are at least two methods to implement the data acceptance procedure (or a combination of the two methods can also be done):

(a) In one approach, the data blocks from the temporary data storage 124 can be transferred from the temporary data storage 124 to the main data storage's volume 118 in a background manner. Simultaneously, corresponding blocks are unmarked in the bitmap. Furthermore, the virtual storage port driver 110 intercepts the only read requests directed to those blocks stored in the temporary data storage 124, which are marked. All other write or read requests are directed (or passed through) to the main data storage's volume 118.

(b) The second approach involves modifying file records in the file allocation table in correspondence with physical addresses of blocks of temporary data storage 124 in such a manner that blocks of the temporary data storage 124 are treated, going forward, as blocks of the main data storage's volume 118. The first approach can be used for different physical structures containing main data storage's volume 118 and the temporary data storage 124, and for files or other logical structures that contains unmoved blocks. The second approach can be used if the temporary data storage 124 occupies a part of the same physical drive as the main data storage's volume 118. These two approaches, or any other approaches available, may be used concurrently.

In the above approaches, the data acceptance procedure is used in conjunction with virtual storage port driver 110. All these utilities bring the main data storage's volume 118 in correspondence with the virtual storage 116, so that all meaningful data stored in the temporary data storage 124 is reflected in the main data storage's volume 118. Generally, the data acceptance procedure "reduces" temporary data storage 124 area simultaneously with reflecting changes in the bitmap. The manner of doing it is chosen as described above.

In one embodiment, from the point in time when acceptance of all the changes begins, the data acceptance procedure starts, and the temporary data storage 124, or a part of it, is used as the read-only portion of the virtual storage 116. The main data storage's volume 118 is used as a random access storage. From this moment forward, all the write requests directed to the temporary data storage 124 blocks are passed to the main data storage's volume 118 simultaneously with unmarking those blocks in the bitmap. Such an algorithm improves the speed of accepting data blocks, since some blocks should not be copied from the temporary data storage 124 to the main data storage's volume 118 at all. In other words, updated blocks can be written to the real location together with reflecting changes in the bitmap so it accelerate the process of accepting data in the background.

After finishing the data acceptance procedure, the virtual storage port driver 110 can be removed from the system.

The above aspect permits identifying certain common implementation approaches to data handling. The first is the use of temporary data storage 124 for storing information that is being modified, with the possibility of multiple changes of data of a single block (for example, representing a cluster).

Another approach is, in effect, a protection mechanism similar to the on-line backup, where every change to a data block is reflected in a separate area of the temporary data storage 124. At the end of the work session, or during the work session, the temporary data storage 124 has both valid and "rewritten" blocks that do not actually represent the main data storage's volume 118 at a current point in time. If correspondence of blocks of the temporary data storage 124 is required, it can be implemented as part of the data acceptance procedure in any point in time, e.g., only some blocks that are older that some set time are accepted, while other blocks of the temporary data storage 124 are ignored.

Correspondence of blocks of the temporary data storage 124 to blocks of the virtual storage 116 can be achieved in a number of ways. For example, a look-up table may be created for the bitmap, where locations of blocks in the temporary data storage 124 correspond to bits in the bitmap. This approach leads to a reduction in required memory resources. Another method is using stubs or links in file descriptors of blocks stored in the temporary data storage 124 for indicating corresponding blocks of files of the temporary data storage 124.

Alternatively, the temporary data storage 124 can be a pre-assigned area on some drive corresponding to the source of the image 116. Blocks of the temporary data storage 124 become accessible to the user applications only when they have been marked in the bitmap. Such an approach leads to wasting some memory resources that are unused during editing of data, but significantly speeds up data processing.

Further, the temporary data storage 124 can be created in the format of incremental backups. Such increments may be created in an "on-line" mode, such as described in application Ser. No. 10/925,928, entitled SYSTEM AND METHOD FOR USING FILE SYSTEM SNAPSHOTS FOR ONLINE DATA BACKUP, now U.S. Pat. No. 7,047,380, which is incorporated herein by reference.

It should be noted that further running of the disk drive required restoration procedure that required a minimal downtime as it is a background process. Furthermore, if the main data storage's volume 118 and the temporary data storage 124 share the same drive or partition, it may be possible to accept temporary data storage 124 blocks by rewriting corresponding blocks of the file allocation table. Thus, some blocks of the temporary data storage 124 do not be restored by copying.

It is also possible to reflect any changes at any point of time from starting the protection procedure. In this case, all the write operations are directed to new blocks, so that it may be possible to restore data only for those blocks of some pre-defined point of time. In this case, the restore point can be defined dynamically and all the changes before the restore point are restored to the main drive.

Figure 2:
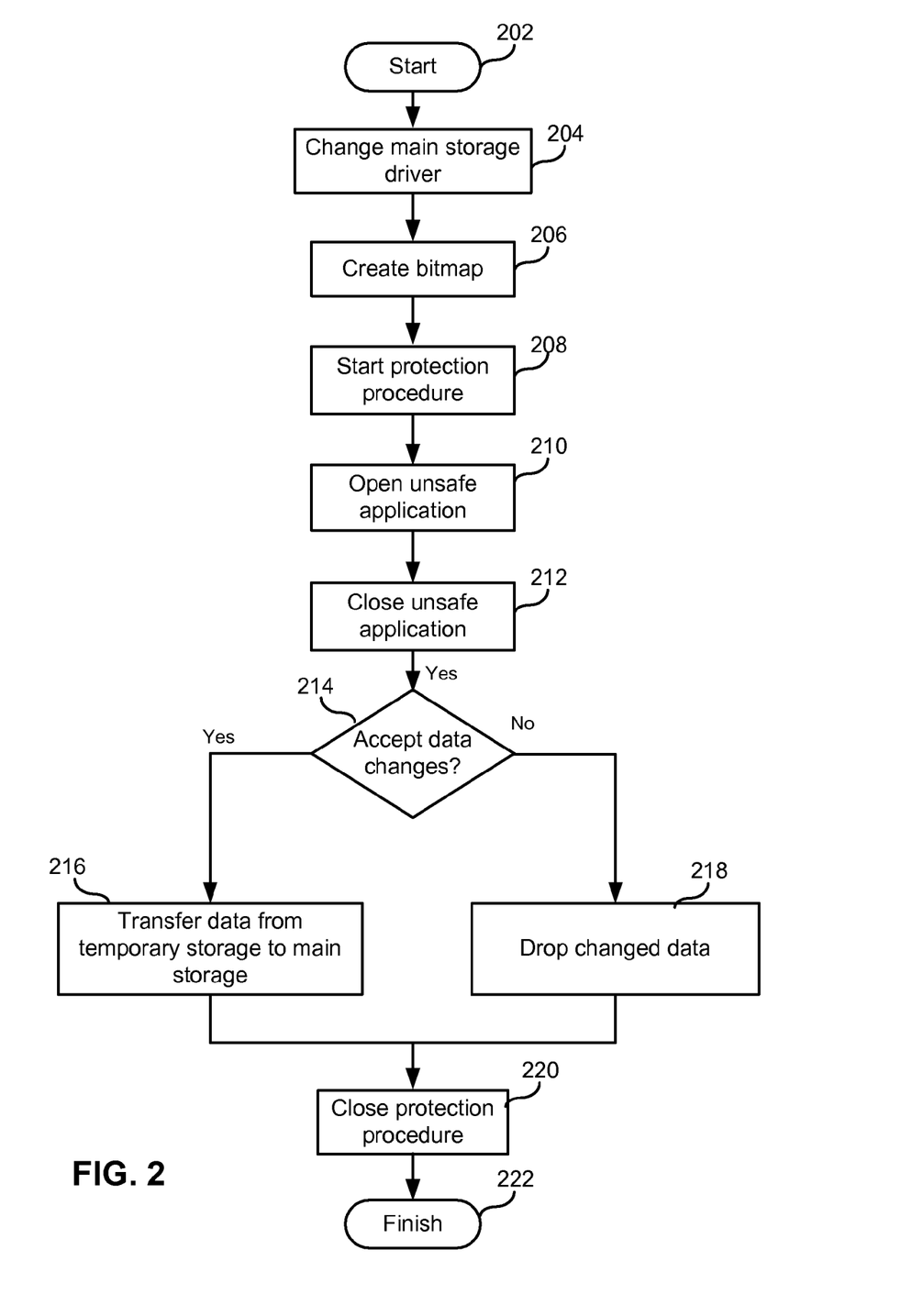
FIG. 2 illustrates the basic process of applying changes stored to data, according to one embodiment of the present invention.

FIG. 2 illustrates a basic procedure according to the method described herein. As shown in FIG. 2, the data protection mode starts in step 202 (for example, while booting up, or by a user's request, before starting an unsafe or potentially unsafe application).

In step 204, the main data storage's volume 118 driver has been changed, so as to implement the redirection procedure 130 (see FIG. 1). The redirection procedure 130 can be implemented either by fully substituting the main data storage's volume 118 driver or by updating the main data storage's volume 118 driver with the added redirection procedure 130, or by a filter that redirects I/O requests either to the protected area of the main data storage's volume 118 or to the temporary data storage 124. The main data storage's volume 118, such as the hard disk drive normally used by the user applications 101, is substituted by the virtual data storage 116 and stays visible to the operating system as a consistent storage area.

At this point, all the READ and WRITE requests to the main data storage's volume 118 will be handled using the dedicated driver 110 for virtual storage 116.

Also, the bitmap is created (step 206). The bitmap reflects the blocks of the main data storage's volume 118 that should be handled during the procedure with redirection to the temporary data storage 124 blocks. Generally, the bitmap initially reflects "used" bocks of the main data storage's volume 118 as unmarked, since there is no purpose in redirection those blocks to the temporary data storage 124 area until blocks are modified. Used blocks also can be blocks of the OS area. Also, blocks of deleted files, or all the blocks of the disk, may be marked.

In another embodiment, the bitmap initially contains no block identifiers, and such identifiers are added to the bitmap during the process of creating the blocks in the temporary data storage 124. In other words, all the blocks of the main data storage's volume 118 that are not reflected in the bitmap remain unmarked. After an attempt to modify a block in the protected area of the main drive 118 occurs, a corresponding block is assigned to the temporary data storage 124 and data is written to the modified block. Also, a record that identifies the block in the main data storage's volume is added to the bitmap and the block remains marked. Such a record can identify not only the block of the main data storage's volume 118, e.g., the block's address, but also a corresponding block of the temporary data storage 124. In the latter case, blocks can be assigned to the temporary data storage 124 dynamically, as needed. Some mechanism should be used to identify correspondence between a block of the temporary data storage 124 and a block of the main data storage's volume 118. Links or stubs or a lookup table may be used to provide such a correspondence. Also, the links can be used as a part of the bitmap.

In one embodiment, the bitmap can include only identifiers of marked blocks, since "unmarking" of the block means removing corresponding identifier from the bitmap. In another embodiment, all the blocks of the main data storage's volume 118 can be reflected in the bitmap using corresponding "flags" or bits.

After starting the process of data protection (or during the data protection mode), virtual storage 116 is mounted and the volume of the main storage driver 112 is replaced (step 204). As shown above, the virtual storage 116 combines a read-only area of the main data storage's volume 118 and the random access temporary data storage 124, to represent storage identified by the OS and, therefore, by the user applications, as a random access integral storage structure, like a disk drive, a drive partition, a folder with subfolders, etc.

In step 206, the bitmap is created to identify units (e.g. blocks or clusters) of the main data storage's volume 118 that are subjects of the modifications during user applications' execution. Therefore, the bitmap should reflect that the corresponding unit is subject to modification. Such units may be blocks, clusters, or other storage sub-units in the main data storage's volume 118 that are subject to the modification. Commonly, such a unit is a lowest-level accessible block.

In step 208, the data protection procedure is started, for example, in response to a user activating an on-screen icon. In step 210, an unsafe application, or some other code that may cause system failure, may be started.

In step 212, unsafe applications are closed or terminated. In other words, at some point in time, there is no purpose in protecting data either by accepting changes or by rejecting changes, e.g., due to a fault of the computing system 20. In step 214, the user estimates the ability to accept the data stored in the temporary data storage 124. It should be noted that estimation is possible at any point in time, and not only during normal operation of the computing system 20, but also after restarting or rebooting of the computing system 20 after a system failure. Since all the modified data, along with the bitmap data, can be stored in a nonvolatile memory, accepting changes may be possible after restarting the system.

After step 214, the process of accepting data may be started, in step 216, or the process of dropping changes 218 may be performed.

Dropping the changes can be done while the data transfer procedure 120 is active, e.g., by resetting the bitmap. Also, dropping changes may be done by deactivating the data protection procedure. Also, dropping the changes may be performing by normal rebooting of the system without the data protection utilities, such that all the changes have no effect after rebooting.

In step 220, after either accepting the changes or dropping the changes, the data protection procedure may be closed. Note that dropping the changes and closing the data protection procedure may be a single operation as it is shown earlier. Also, such an operation may be performed simultaneously with an emergency shutdown of the system, if the emergency shutdown is initiated by the unsafe application.

In step 222, the process is terminated.

Since input/output operations relating to storage devices are performed, it may be useful to explain data processing on an example of the input/output request packets (IRPs). In the Windows operating systems, an input/output request packet (IRP) is a request to the OS kernel to perform some action relating to the storage device, such as a WRITE to or a READ from the storage device. Note that IRPs sometimes go by other names (depending on the hardware and operating system involved), but, in general, perform the above function. In this discussion, IRPs directed to reading or writing data from/to the storage device are primarily at issue. Other IRPs, such as control IRPs or drive condition requests are treated as they would be treated in normal OS operation mode. In other words, such IRPs are passed to low level drivers, e.g., to the driver of whichever storage device where the archive is physically stored. Detailed discussion of such IRPs is outside the scope of this invention.

Figure 3:
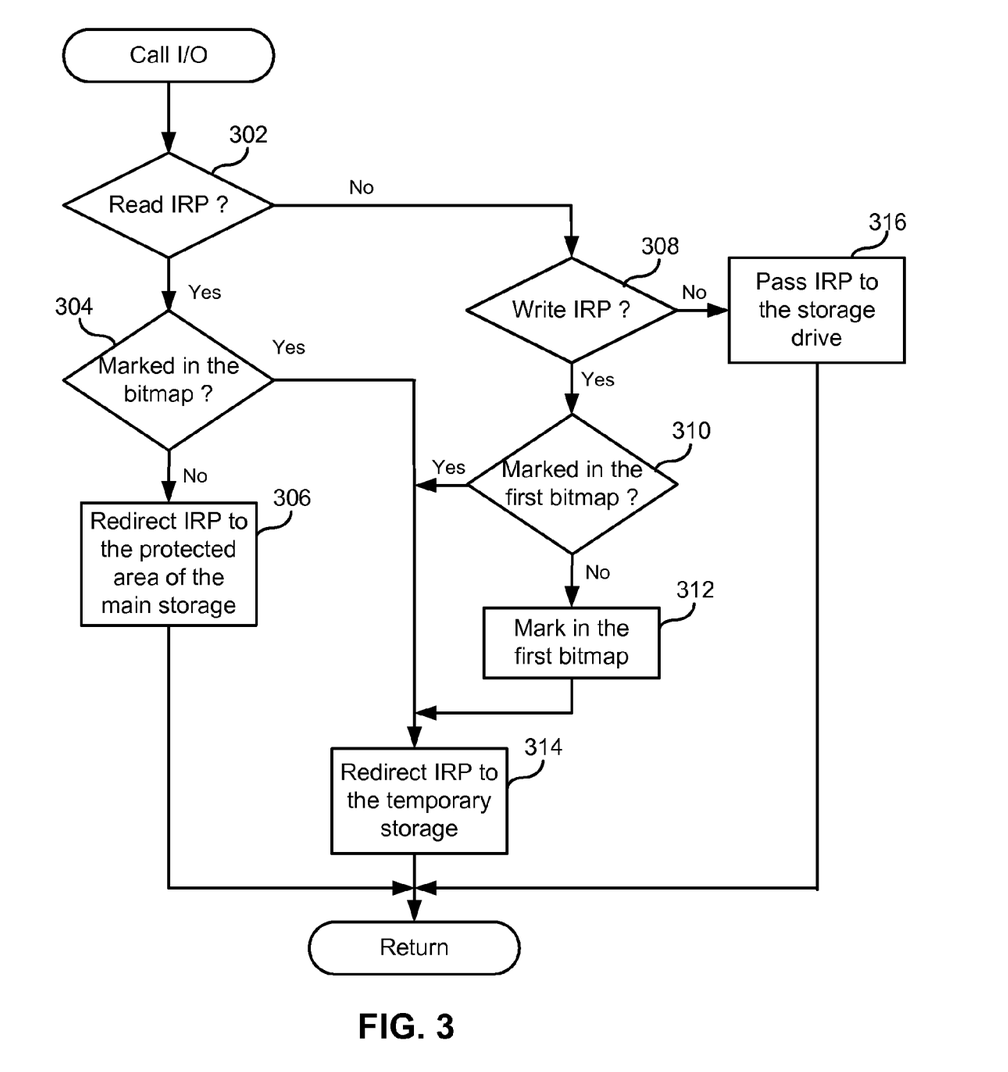
FIG. 3 illustrates the process of handling IRPs in the present invention.

FIG. 3 illustrates the process of handling IRPs. FIG. 3 also describes how virtual storage 116 fits into the overall protection scheme. As shown in FIG. 3, the process stays in a waiting mode 302 when no IRPs are generated by system utilities or by a user application. After receiving an IRP directed to the virtual storage, in step 302, the process first checks if the IRP is a READ IRP. If it is a READ IRP, then, in step 304 the process checks if the particular storage unit is marked in the bitmap (which indicates which blocks (e.g., a cluster) of the virtual storage 116 was modified and corresponding modified data is stored in the temporary data storage 124). If the answer is no, then the IRP is redirected to the protected area of the main data storage's volume 118 in step 306. The process then returns back to step 302. If, in step 304, the storage unit is recognized as marked in the first bitmap, then the access request is redirected to the temporary data storage 124 in step 314. The process then returns to step 302.

If, in step 302, the IRP is not a READ IRP, then the process checks if the IRP is a WRITE IRP (step 308). If it is not a WRITE IRP, then, in step 316, the IRP is passed to the underlying physical drive, and the process returns to step 302. Note that the main data storage's volume 118 and temporary data storage 124 can all "live" on the same physical drive, either as an entire drive, or as files or folders. Thus, other IRPs are passed to any preassigned physical storage.

If, in step 308, the IRP is a WRITE IRP, then the process checks if the storage unit is marked in the first bitmap (step 310). If it is, then the process proceeds to step 314, as described above. If it is not, then the storage unit is marked in the bitmap (step 312) and the process proceeds to step 314, and data is written to the corresponding block of the temporary data storage 124.

In other words, all attempts to WRITE to the main data storage's volume 118 are redirected to the temporary data storage 124. The system itself does not "know" that the storage it is accessing is the temporary data storage 124, rather than its actual (main) storage 118. At some point in time, the data that is stored in the temporary data storage 124 is then transferred to the main data storage's volume 118, effecting accepting data.

Figure 4:
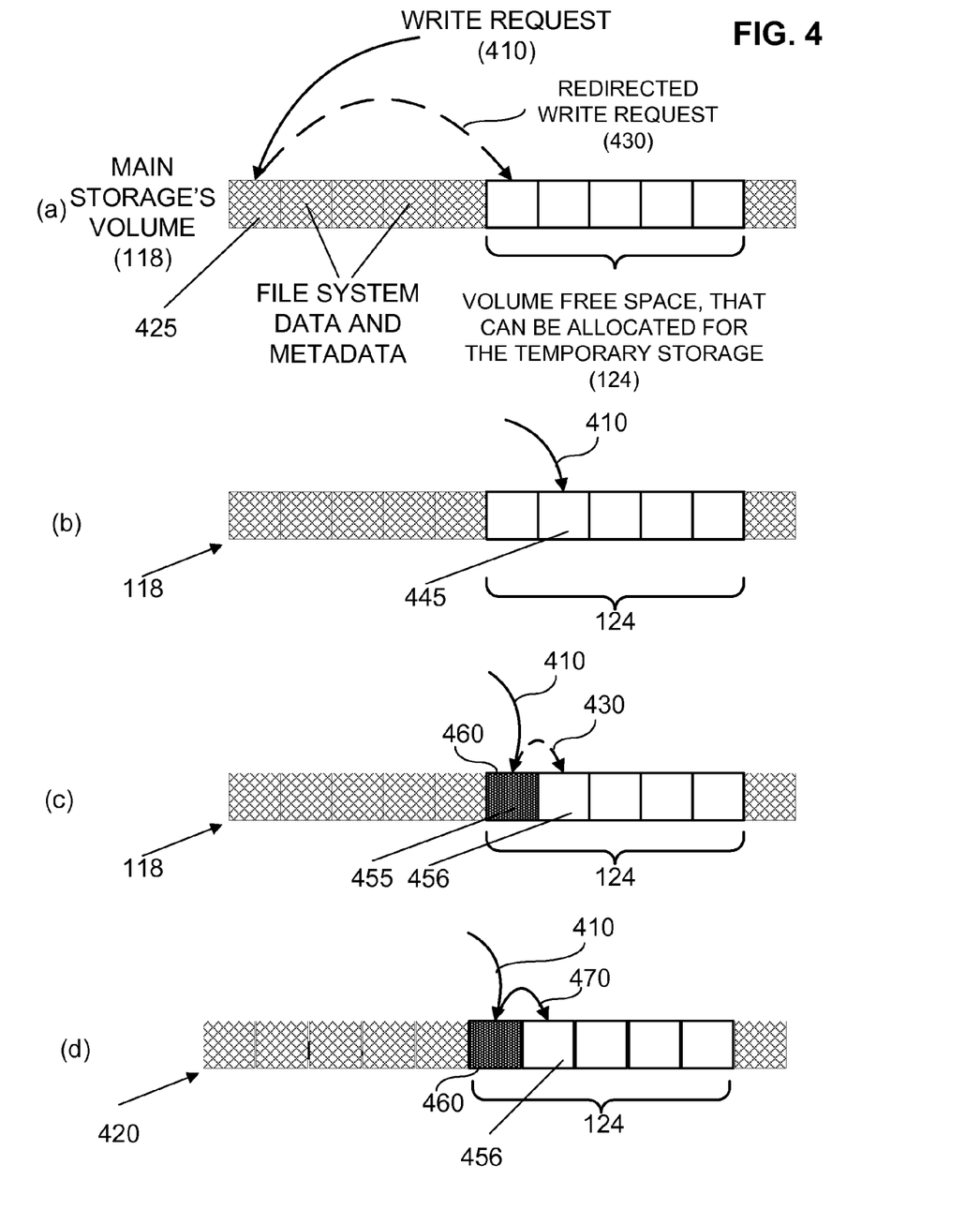
FIG. 4 describes the process of transferring data when all the changes are made final.

FIG. 4 describes the process of writing the data blocks to the area allocated for the temporary storage.

If, in step 308 (FIG. 3), the IRP is a WRITE IRP 410 to data block 425, which is marked in the first bitmap and located in the occupied area (for example data block 425) by the data of the main data storage's volume, i.e. contain previously written data (FIG. 4*a*), then the data block to be written is written (redirected write request 430) to the free space of the temporary storage 124.

In other case, as shown in FIG. 4*b*, if the attempt to WRITE data block is directed to data block (445), which is not marked in the first bitmap, then the data block to be written can be written to the temporary storage 124 to it destination place 445 if it is not occupied previously written data of the temporary storage 124.

If the destination data block 455 is occupied by other written data in the temporary storage (FIG. 4*c*), then the data block to be written can be written (redirected write request 430) to the free space 456 of the temporary storage 124. Also if the destination data block 455 is occupied previously written data 460 of the temporary storage (FIG. 4*d*), then the previously written data block 460 can be moved (470) to the free space 456 (or to it destination area, as was described above) of the temporary storage 124, and the data block to be written can be written to the released area 460 of the temporary storage 124.

Also, if the data block corresponded to data block to be written was previously written to the temporary storage, then the written data block can be rewritten by the new data block, if new point in time of the restoration was not created.

An additional bitmap can be created with data consisting of a mutual disposition of the data block in the temporary storage 124 and volume of the main storage 118, i.e., is data block written to the volume of the main storage place, where it had to be written. This additional bitmap can be used for merging data from the temporary storage 124 with data stored on the volume of the main storage 118, as not to rewrite blocks, which are already written to their destination place.

Note that part of the temporary data storage 124 can be "frozen" to create an additional restore point, as shown above.

Also, the temporary storage 124 can allocate all free space of the volume of the main storage device 118 or only what is necessary at the current moment, and which can be extended with the new data block to be written to the temporary storage 124.

Additionally, a hash value can be calculated for each data block stored in the temporary data storage 124. The hash value can be calculated during the data write operation to the temporary storage 124.

Also, the hash value of the data block to be written can be calculated and can be compared with the hash value of the stored data block in the temporary storage 124. If the hash values are compared, then data block might be not written to the temporary storage 124, instead, an address of the already stored data block can be written to temporary storage 124 in place of the data.

If the data block must be rewritten, then the stored data block can be placed in the free space of the temporary storage 124, with a link to it, and the data block to be written is written instead to old data block. In another case, a data block to be written can be written to the free space of the temporary storage 124 with a link to its new location.

Figure 5:
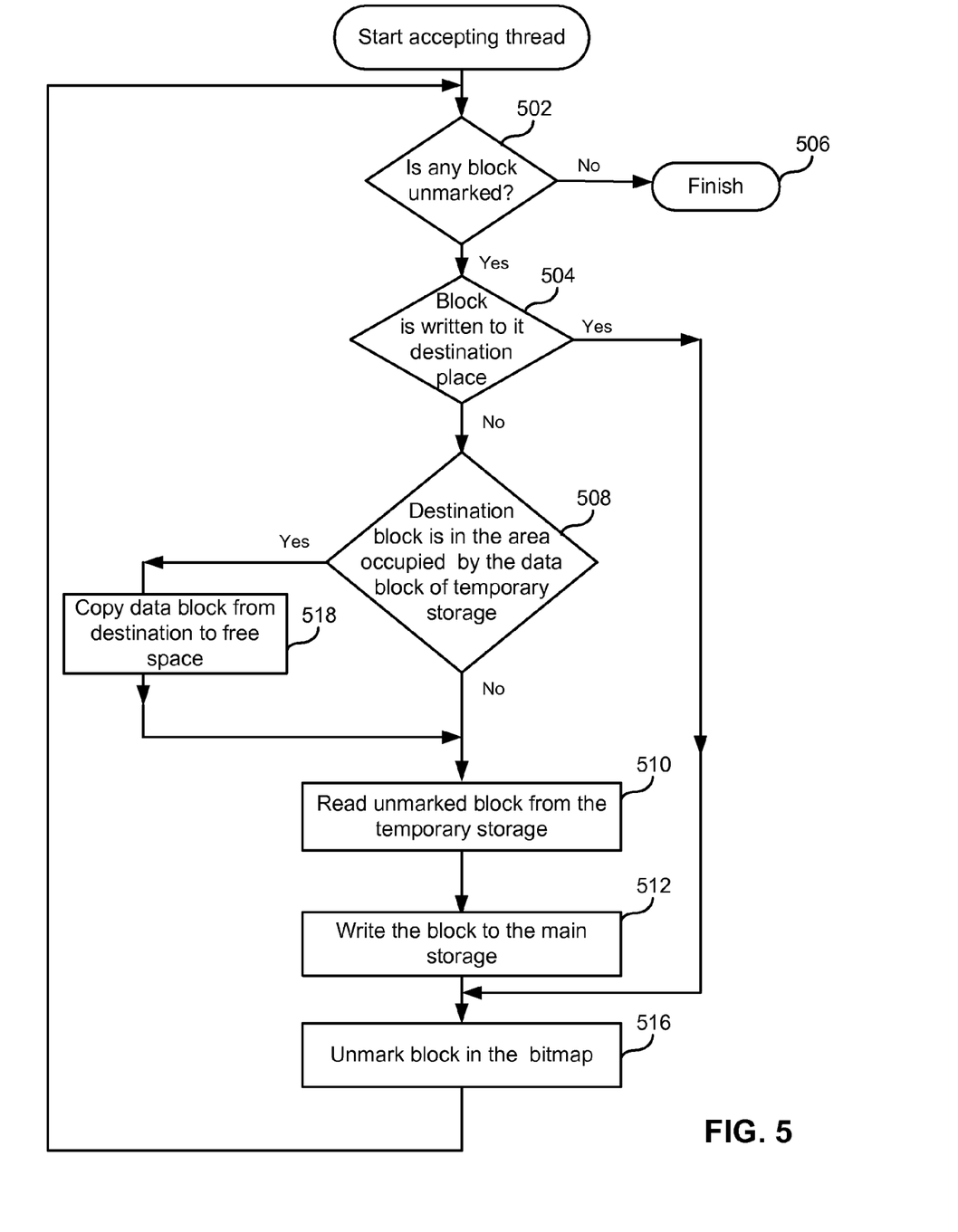
FIG. 5 illustrates an algorithm of accepting data stored in the temporary data storage.

FIG. 5 describes the process of accepting data stored in the temporary data storage 124. As shown in FIG. 4, in step 502, the process checks if there any block in the bitmap marked. If the answer is "no", then the temporary storage area is empty and the accepting process is finished in step 506. If the answer is "yes," some blocks requires copying from the temporary data storage 124 to the corresponding area on the main data storage's volume 118. In step 504 a location of the data block is checked. If the data block is written to it destination place on the volume of the main storage as was described above, then the appropriate bits are unmarked or reset in the bitmap (step 516). If the data block was written to any free place of the temporary data storage (was not able/not needed to write it to its destination place on the volume of the main storage 118), then the process proceeds to step 508, where the destination place for data block is checked. If destination place for data block to be moved (first data block) is occupied by another data block (a second data block) of the temporary storage 124, then process goes to step 518, wherein the second data block is moved to the free space of the temporary storage 124 (or another data storage device, such as local storage device, network storage device, flash drive, memory unit, or like), and the process goes to step 510. If destination place for first data block is not occupied by the second data block, then the process goes to step 510. In step 510 data is read from the temporary data storage 124 (step 510) and then written to it destination place on the main data storage's volume 118 instep 512. The appropriate bits are unmarked or reset in the bitmap (step 516).

If the user decides to restore the main data storage's volume 118 to its previous state, then, in step 218, the bitmap is reset. Then virtual storage port driver 110 is removed from the system (or deactivated). After that the volume of the main storage is restored and may be used without protection procedure.

Another mechanism contemplated by the present method may be implemented when the temporary data storage 124 and the protected area share the same drive or drive partition. The mechanism includes protecting used blocks of the main drive, and writing some blocks to the temporary data storage 124 without marking in the bitmap.

Since commonly the change in a file is done by writing the file to a new area, the changes to the file might only require creating links to the changed blocks of the file allocation table stored in the temporary data storage 124, while blocks (clusters) of the file may be written to the locations of the temporary data storage 124 already indicated in the changed file allocation table, and can be used as-is, without a need for creating additional links and, in some cases, bits in the bitmap. Also, in this case, there is no point in marking blocks of the file in the bitmap, since these blocks should not be copied while accepting changes and should not be write-protected.

Since there is no need, in this case, for a separate redirection procedure for blocks of newly created files (as well for replaced files), as another option, the changes can be accepted by merging the file allocation tables.

Figure 6:
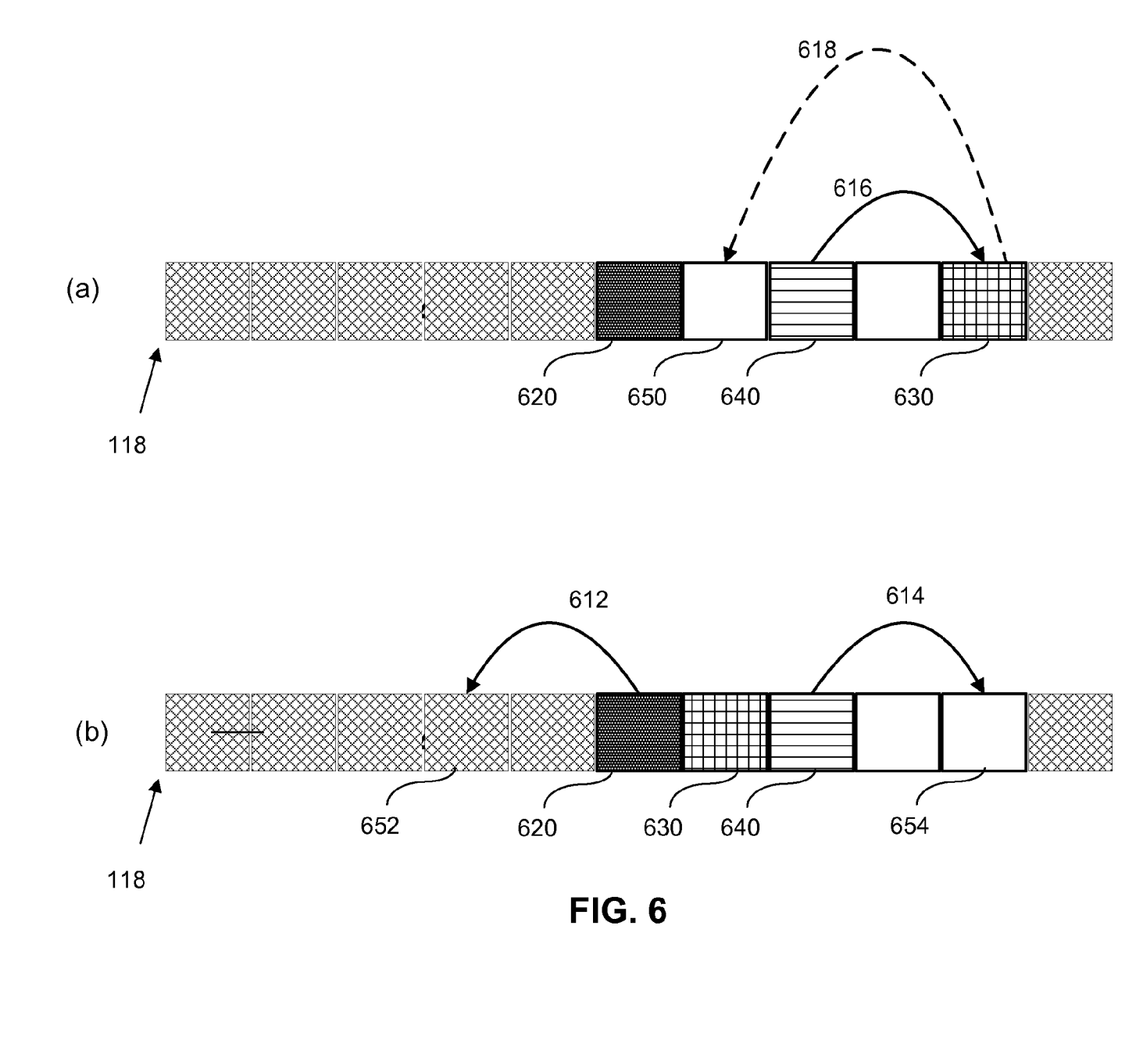
FIG. 6 illustrates the process of accepting data stored in the temporary data storage.

FIG. 6 illustrates the process of accepting data stored in the temporary data storage. If the data block is written to it destination place on the volume of the main storage, i.e. data block is written there, where it must be written without using temporary storage, then the appropriate bits are unmarked or reset in the bitmap. In FIG. 6a if the data block 640 was written to free place of the temporary data storage (FIG. 4(a)-4(c)), but no to it destination place on the volume of the main storage, then the destination place for data block is checked for data in the destination place. If the destination place for data block to be moved 640 (first data block) is occupied by the other data block 630 (second data block) of the temporary storage, then the second data block is moved 618 to the free space 650 of the temporary storage (or other data storage device, HDD, memory, or others), and first data block is moved (616) to it destination place. The appropriate bits for this data block are unmarked or reset in the bitmap. The moved second data block further moved to it destination place as was described above. Also the destination place for second data block can be checked instead moving this data block to any free space temporary storage, so if the destination place of the second data block is free, then the second data block can be written to it destination place. If the data block is occupied by the other data block, then addition check destination place can be performed, or data block can be written to free space of the temporary storage.

If the destination place for the first data block is not occupied by the second data block, then the data 620 is read from the temporary data storage and then written to the it destination place 652 on the main data storage 420. The appropriate bits are unmarked or reset in the bitmap.

In case if the destination place for the first data block is in the free space of the temporary storage, then data 640 is read from the temporary data storage and then written to the it destination place 654 on the main data storage's volume 118, and this data block in the temporary storage can be marked as an occupied data block.

Figure 7:
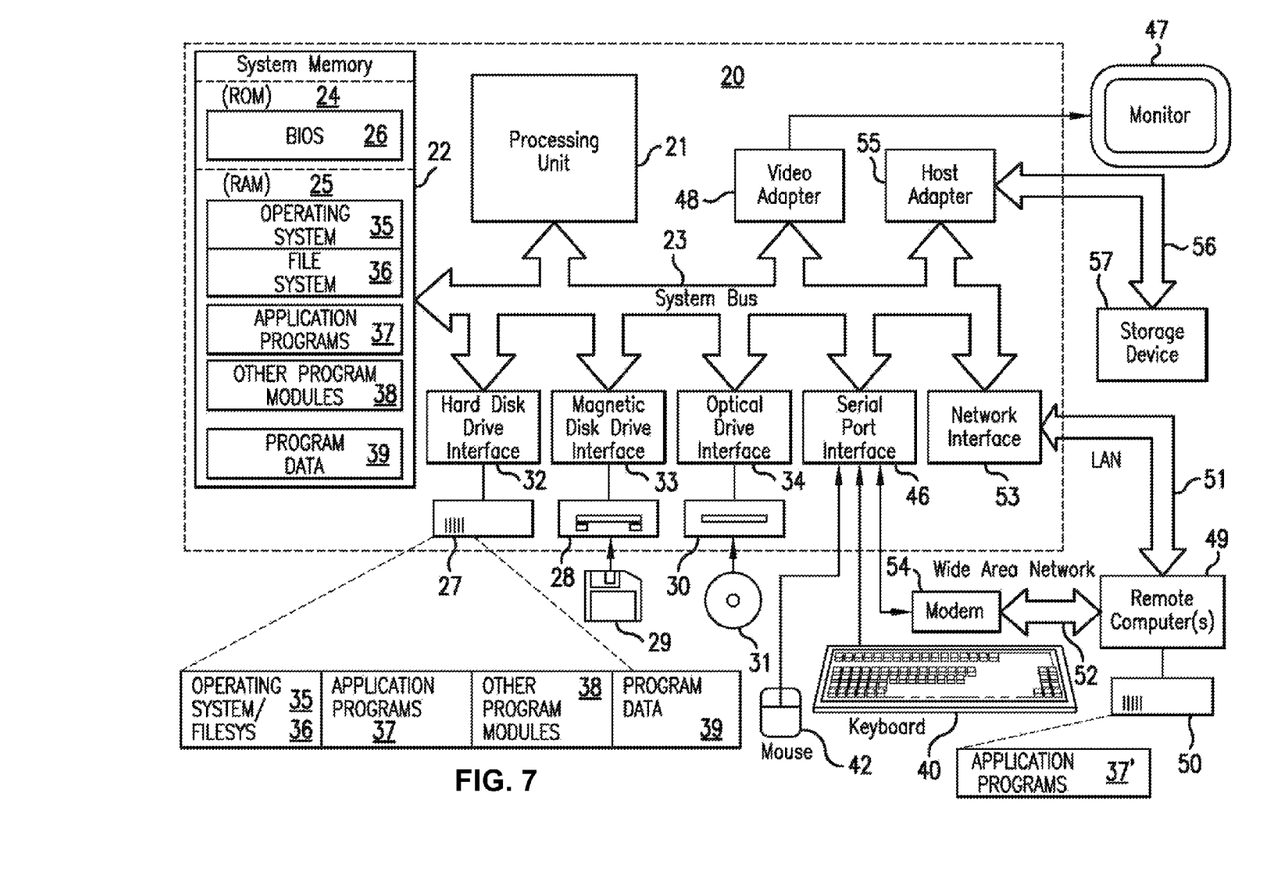
FIG. 7 illustrates an example of a computer architecture that may be used in the present invention.

With reference to FIG. 7, an exemplary system for implementing the invention includes a general purpose computing device in the form of a personal computer or server 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24.

The personal computer 20 may further include a hard disk drive 27 for reading from and writing to a hard disk, not shown in the figure, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide a non-volatile storage of computer readable instructions, data structures, program modules/subroutines, such that may be used to implement the steps of the method described herein, and other data for the personal computer 20. Although the exemplary environment described herein employs a hard disk, a removable magnetic disk 29 and a removable optical disk 31, it should be appreciated by those skilled in the art that other types of computer readable media that can store data accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (e.g., Windows™ 2000). The computer 20 includes a file system 36 associated with or included within the operating system 35, such as the Windows NT™ File System (NTFS), one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices, such as speakers and printers.

The personal computer 20 may operate in a networked environment using logical connections to one or more remote computers 49. The remote computer (or computers) 49 may be represented by a personal computer, a server, a router, a network PC, a peer device or other common network node, and it normally includes many or all of the elements described above relative to the personal computer 20, although only a memory storage device 50 is illustrated. The logical connections include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used. Such computers as described above can be used in conventional networks, e.g. the Internet, local area networks, regional networks, wide area networks, and so forth. These networks can link various resources, such as user computers, servers, Internet service providers, telephones connected to the network and so on.

Having thus described an embodiment of the invention, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A method for data protection comprising:
   (a) mounting a virtual storage that combines a full access temporary storage and a READ-only portion of a volume of a main storage, wherein the READ-only portion represents a protected area of the volume with useful data and the temporary storage represents a free space of the volume;
   (b) generating a bitmap for blocks of the virtual storage with all blocks initially unmarked;
   (c) redirecting virtual storage write requests to the temporary storage, wherein
      (1) if a data block must be written to initially occupied space of the volume of the main storage, then this data block is written to free space of the temporary storage;
      (2) if a data block must be written to an initially free space of the volume of the main storage, which is allocated to the temporary storage, and the initially free space is not occupied by the another data block of the temporary storage, then this data block is written to the free space, but this data block still belongs to the temporary storage;
      (3) if a data block must be written to the initially free space of the volume of the main storage, which is allocated to the temporary storage, and the initially free space is occupied by the another data block, which was written to the temporary storage, then this data block is written to other free space of the temporary storage;
   (d) marking, in the bitmap, blocks of the virtual storage corresponding to blocks of the temporary storage that are being written to;
   (e) redirecting, to the READ-only portion, read requests for unmarked blocks;
   (f) redirecting, to the temporary storage, read requests for marked blocks;
   (g) upon an acceptance, by a user, of a state of the virtual storage, merging the temporary storage with unmarked blocks of the READ-only portion to form an integral storage that contains all the useful data, wherein
      (1) for the data blocks of (c)(1), moving the data blocks to the READ-only portion, to replace unmarked corresponding blocks in the READ-only portion;
      (2) for the data blocks of (c)(2), leaving the data blocks in place;
      (3) for the data blocks of (c)(3), first moving the data blocks that prevented writing the original block to the intended located in the temporary storage, and then moving the data blocks of (c)(3) to the location that was originally intended for these blocks;
   and
   (h) upon a rejection, by the user, of a state of the virtual storage, terminating the redirecting.

2. The method of claim 1, wherein, in step (g), the volume is located on any of an optical drive, RAM, a DVD-ROM, a flash disk, a distributed storage, a hard disk drive and a network storage element.

3. The method of claim 1, further comprising creating a plurality of virtual storages, all of which use the same READ-only portion.

4. The method of claim 1, wherein blocks of temporary storage are "write-once-read-many times" blocks.

5. The method of claim 1, further comprising assigning all free blocks of the volume as blocks of the temporary storage.

6. The method of claim 1, wherein the merging is a background process that is transparent to all user applications that utilize the virtual storage.

7. The method of claim 1, wherein step (h) further comprises at least partially removing a virtual storage driver that was used for the redirection.

8. The method of claim 1, further comprising hiding the temporary storage from the operating system.

9. A computer useable storage medium having computer executable program logic stored thereon for executing on a processor for processing objects within an object-oriented infrastructure, computer executable program logic implementing the steps of claim 1.

10. A system for data protection, the system comprising:
    (a) a virtual storage that combines a full access temporary storage and a READ-only portion of a volume of a main storage, wherein the READ-only portion represents a protected area of the volume with useful data and the temporary storage represents a free space of the volume;
    (b) a bitmap for blocks of the virtual storage with all blocks initially unmarked;
    (c) virtual storage write requests that are redirected to the temporary storage, wherein
       (1) if a data block must be written to initially occupied space of the volume of the main storage, then this data block is written to free space of the temporary storage;
       (2) if a data block must be written to an initially free space of the volume of the main storage, which is allocated to the temporary storage, and the initially free space is not occupied by the another data block of the temporary storage, then this data block is written to the free space, but this data block still belongs to the temporary storage;
       (3) if a data block must be written to the initially free space of the volume of the main storage, which is allocated to the temporary storage, and the initially free space is occupied by the another data block, which was written to the temporary storage, then this data block is written to other free space of the temporary storage;
    (d) wherein the system marks in the bitmap blocks of the virtual storage corresponding to blocks of the temporary storage that are being written to;
    (e) read requests for unmarked blocks that are redirected by the system to the READ-only portion;
    (f) read requests for marked blocks that are redirected by the system to the to the temporary storage;
    (g) upon an acceptance, by a user, of a state of the virtual storage, the system merges the temporary storage with unmarked blocks of the READ-only portion to form an integral storage that contains all the useful data, wherein (1) for the data blocks of (c)(1), the system moves the data blocks to the READ-only portion, to replace unmarked corresponding blocks in the READ-only portion;
(2) for the data blocks of (c)(2), the system leaves the data blocks in place;
(3) for the data blocks of (c)(3), the system first moves the data blocks that prevented writing the original block to the intended located in the temporary storage, and then moves the data blocks of (c)(3) to the location that was originally intended for these blocks; and (h) upon a rejection, by the user, of a state of the virtual storage, the system terminates the redirecting.

* * * * *